(12) United States Patent
Hong et al.

(10) Patent No.: US 12,348,335 B2
(45) Date of Patent: Jul. 1, 2025

(54) ELECTRONIC DEVICE AND METHOD OF ESTIMATING CHANNEL IMPULSE RESPONSE

(71) Applicant: Samsung Electronics Co., Ltd., Gyeonggi-do (KR)

(72) Inventors: Sukgi Hong, Gyeonggi-do (KR); Hyunchul Kim, Gyeonggi-do (KR); Jungsik Park, Gyeonggi-do (KR); Yi Yang, Gyeonggi-do (KR); Woosup Lee, Gyeonggi-do (KR); Hana Choe, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 280 days.

(21) Appl. No.: 18/095,750

(22) Filed: Jan. 11, 2023

(65) Prior Publication Data

US 2023/0164001 A1 May 25, 2023

Related U.S. Application Data

(63) Continuation of application No. PCT/KR2022/012998, filed on Aug. 31, 2022.

(30) Foreign Application Priority Data

Nov. 22, 2021 (KR) .................. 10-2021-0161035

(51) Int. Cl.
*H04L 25/02* (2006.01)
*H04B 1/7163* (2011.01)

(52) U.S. Cl.
CPC ..... *H04L 25/0204* (2013.01); *H04B 1/71637* (2013.01); *H04L 25/0212* (2013.01)

(58) Field of Classification Search
CPC ............ H04B 1/71637; H04L 25/0204; H04L 25/0212
See application file for complete search history.

(56) References Cited

U.S. PATENT DOCUMENTS 7,418,046 B2   8/2008   Gore et al.
10,852,915 B1  12/2020  Behzadi et al.
(Continued)

FOREIGN PATENT DOCUMENTS

CN   112484625 A      3/2021
KR   10-2008-0096530 A   10/2008
(Continued)

*Primary Examiner* — David B Lugo
(74) *Attorney, Agent, or Firm* — Cha & Reiter, LLC

(57) ABSTRACT

In one embodiment, an electronic device may include a plurality of antennas, at least one wireless communication module configured to transmit and receive wireless signals through the plurality of antennas, and at least one processor operatively connected to the wireless communication module. The at least one wireless communication module or the at least one processor may be configured to, based on one or more ultra-wide band (UWB) signals received from a target device, obtain first pieces of phase information corresponding to first channel impulse response (CIR) indices and second pieces of phase information corresponding to second CIR indices, and determine information on the one or more UWB signals based on a slope between the first pieces of phase information and a slope between the second pieces of phase information.

16 Claims, 8 Drawing Sheets

(56) References Cited

U.S. PATENT DOCUMENTS

2018/0287568 A1* 10/2018 Malik ................. H04L 25/0222
2024/0230831 A1*  7/2024 Dhekne .................. G01S 5/021

FOREIGN PATENT DOCUMENTS

| KR | 10-2009-0013082 A |  2/2009 |
| KR | 10-2017-0009986 A |  1/2017 |
| KR | 10-2193947 B1 | 12/2020 |
| KR | 10-2021-0002906 A |  1/2021 |
| KR | 10-2021-0030180 A |  3/2021 |
| KR | 10-2021-0130400 A | 11/2021 |

* cited by examiner

ELECTRONIC DEVICE AND METHOD OF ESTIMATING CHANNEL IMPULSE RESPONSE

CROSS-REFERENCE TO RELATED APPLICATIONS

This application is a continuation of International Application No. PCT/KR2022/012998 designating the United States, filed on Aug. 31, 2022, in the Korean Intellectual Property Receiving Office and claiming priority to Korean Patent Application No. 10-2021-0161035, filed on Nov. 22, 2021, in the Korean Intellectual Property Office, the disclosures of which are incorporated by reference herein in their entireties.

BACKGROUND

1. Field

One or more embodiments of the instant disclosure generally relate to an electronic device and method of estimating a channel impulse response (CIR).

2. Description of Related Art

Ultra-wideband (UWB) communication technology may be implemented under The Institute of Electrical and Electronic Engineers (IEEE) 802.15.4 standard and may implement short-range high-speed wireless communication using a wide frequency band of more than several GHz in the baseband, low spectral density, and short pulse width (e.g., 1 to 4 nsec). UWB communication technology is optimized for usage of broadband bandwidth.

In IEEE 802.15.4z, communication security has been supplemented by adding a security field called scrambled time stamp (STS) to the previous IEEE 802.15.4a standard. Due to this, UWB communication technology has attracted attention in various technical fields. For example, the Car Connectivity Consortium (CCC), which is a vehicle communication standard organization, has chosen UWB communication technology as the representative technology of its Phase 3, and thus, products are being developed using UWB communication technology. UWB communication technology has also been developed in other field, such as being used as trackers, in location-based services (LBS), payments, and door locks.

SUMMARY

Services utilizing ultra-wideband communication (UWB) communication, such as a finding service to find a target device (e.g., finding my phone), a service that employs tags, or a service that employs trackers, may use the angle of arrival (AoA) of a signal (e.g., UWB signal). By using UWB communication, since the electronic device may identify (e.g., extract) the UWB signals received from two antennas at approximately the same time, and the electronic device may calculate the AoA based on the phase difference of arrival (PDoA) between the UWB signals received by the two antennas and may accurately calculate a position (e.g., direction) by using the AoA. In the finding service to find a target device, user experience corresponds to accuracy, i.e., user experience may be poor as the accuracy of AoA decreases. Since the UWB signal received by the electronic device to find the target device may be unstable depending on the location and the direction of the target device with respect to the electronic device, the accuracy of AoA may decrease. Thus, there is a demand for techniques to improve the accuracy of the AoA.

The technical problem to be achieved in the present disclosure is not limited to the technical problem mentioned above, and other technical problems not mentioned above are clearly understood by one of ordinary skill in the art from the following description.

According to an embodiment, an electronic device includes a plurality of antennas, at least one wireless communication module configured to transmit and receive wireless signals through the plurality of antennas, and at least one processor operatively connected to the wireless communication module, wherein the at least one wireless communication module or the at least one processor is configured to, based on one or more UWB signals received from a target device, obtain first pieces of phase information corresponding to first channel impulse response (CIR) indices and second pieces of phase information corresponding to second CIR indices, and determine information on the one or more UWB signals based on a slope between the first pieces of phase information and a slope between the second pieces of phase information.

According to an embodiment, an operating method of an electronic device includes based on one or more UWB signals received from a target device, obtaining first pieces of phase information corresponding to first CIR indices and second pieces of phase information corresponding to second CIR indices, and determining information on the one or more UWB signals based on a slope between the first pieces of phase information and a slope between the second pieces of phase information.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
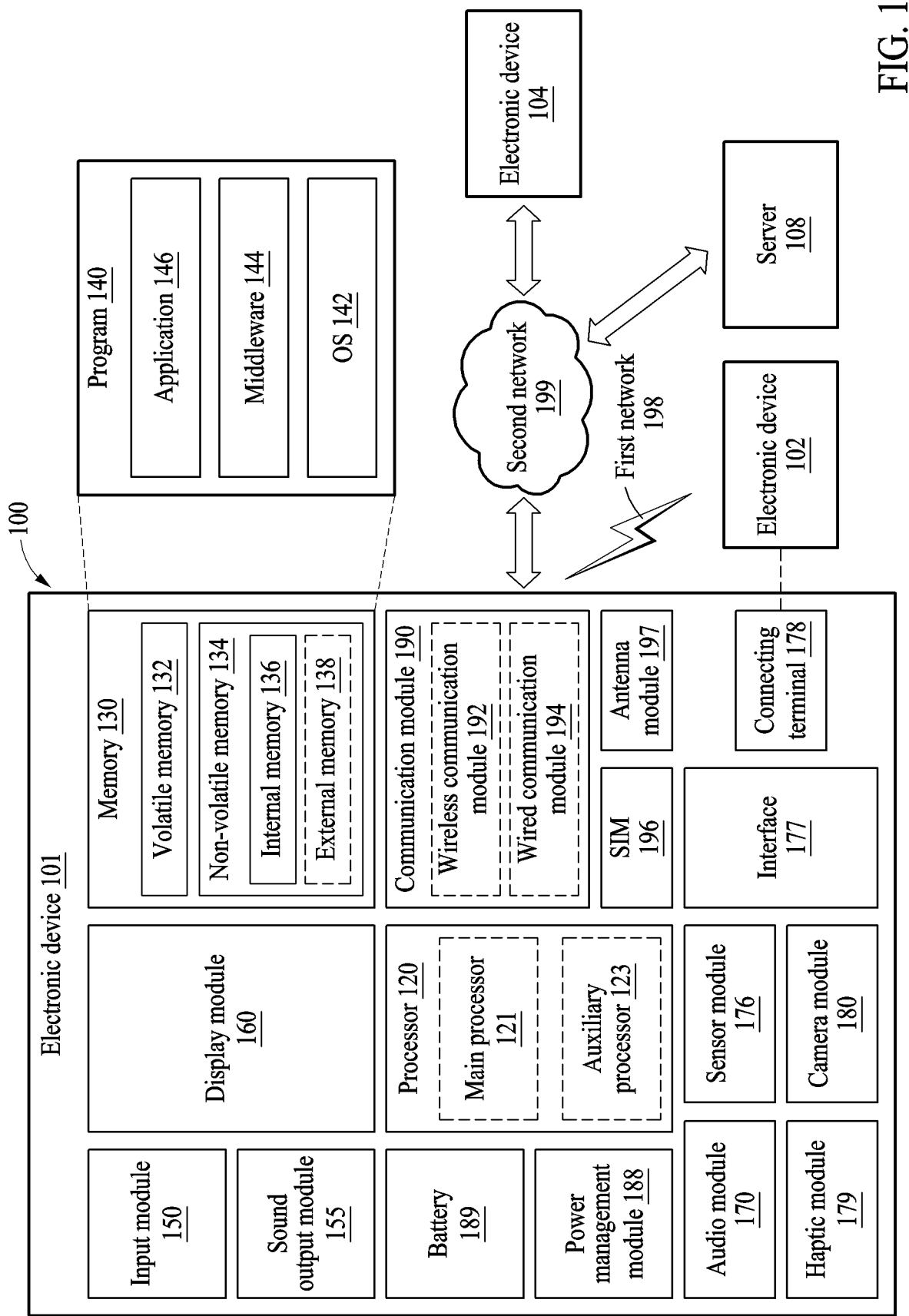
FIG. 1 is a block diagram illustrating an electronic device in a network environment according to an example embodiment.

Certain embodiments disclosed herein may provide a method of determining a confidence level for an AoA of a UWB signal by using various pieces of phase information. Certain embodiments may provide a method of determining whether a communication environment of a UWB signal is a line-of-sight (LoS) environment or a non-LoS (NLoS) environment by using various pieces of phase information.

By determining the confidence level of the AoA of the UWB signal by using various pieces of phase information, one or more embodiments disclosed herein may improve user experience by providing the user with accurate direction information based on the AoA of UWB signal.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to an example embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101.

The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electrical signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
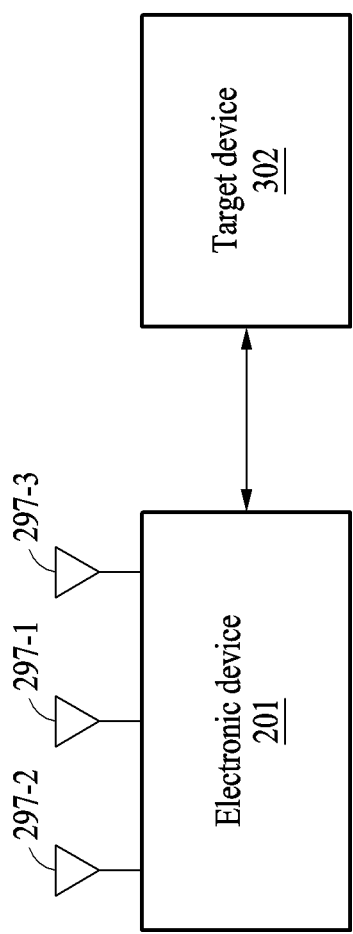
FIG. 2 is a diagram illustrating a method of estimating an angle of arrival (AoA), according to one embodiment.

FIG. 2 is a diagram illustrating a method of estimating an angle of arrival (AoA), according to one embodiment.

Referring to FIG. 2, an electronic device 201 (e.g., the electronic device 101 of FIG. 1) may include a plurality of ultra-wideband (UWB) antennas 297-1 to 297-3 (e.g., the antenna module 197 of FIG. 1). The electronic device 201 may perform UWB communication with a target device 302 (e.g., the electronic device 102 or the electronic device 104 of FIG. 1) by using the plurality of UWB antennas 297-1 to 297-3. The electronic device 201 may accurately measure the position of the target device 302 by obtaining the distance and the direction to the target device 302 with respect to the position of the electronic device 201 by using UWB signals received from the plurality of UWB antennas 297-1 to 297-3. The description of FIG. 2 is provided based on that there UWB antennas. However, the instant disclosure is not limited thereto, and any number of UWB antennas may be implemented.

The electronic device 201 may identify (e.g., obtain) the distance between the electronic device 201 and the target device 302 based on time of flight (ToF). The electronic device 201 may transmit a signal (e.g., UWB signal) to the target device 302, and the target device 302 may transmit another UWB signal to the electronic device 201, in response to the signal transmitted by the electronic device 201. The UWB signal transmitted by the target device 302 may include response time information (e.g., transmission time information of the UWB signal) indicating the amount of time taken by the target device 302 to respond to the signal transmitted by the electronic device 201. The electronic device 201 may calculate the distance between the electronic device 201 and the target device 302 by using transmission time information indicating when the target device 302 transmits the signal, reception time information of the UWB signal transmitted by the target device 302, and the response time information included in the UWB signal. The electronic device 201 may perform a two way ranging (TWR) method and/or a time difference of arrival (tDoA) method to identify the distance between the electronic device 201 and the target device 302.

The electronic device 201 may identify the direction of the target device 302 (e.g., the relative direction between the target device 302 and the electronic device 201) by identifying the direction of the UWB signal approaching the electronic device 201 from the target device 302 by measuring the AoA of the UWB signal transmitted by the target device 302. The AoA of the UWB signal may be measured (e.g., calculated or estimated) based on signals received by two or more UWB antennas (e.g., the UWB antennas 297-1 to 297-3), the distance(s) between the UWB antennas (e.g., the UWB antennas 297-1 to 297-3), and the phase differences between the UWB signals received from two or more UWB antennas. The distance between two UWB antennas may be set based on the UWB signals the electronic device 201 is designed to receive from the target device 302.

The electronic device 201 may measure the AoA of the UWB signal transmitted by the target device 302 by using the plurality of UWB antennas 297-1 to 297-3. Each of the plurality of UWB antennas 297-1 to 297-3 may be arranged at a predetermined position in the electronic device 201. The second UWB antenna 297-2 and the third UWB antenna 297-3 may be arranged at predetermined positions in the electronic device 201 with respect to the first UWB antenna 297-1. The electronic device 201 may measure the AoA of the UWB signal by using a first UWB antenna set (e.g., the first UWB antenna 297-1 and the second UWB antenna 297-2) and/or a second UWB antenna set (e.g., the first UWB antenna 297-1 and the third UWB antenna 297-3). In one embodiment, the first UWB antenna 297-1 may be common in both antenna sets, but the instant disclosure is not limited thereto. The antenna set may be configured by any combinations of two of the three UWB antennas 297-1 to 297-3. To measure the AoA, two UWB antennas of the three UWB antennas 297-1 to 297-3 may be used depending on the front-end configuration of the electronic device 201. The AoA of the UWB signal may be measured by using the UWB signal(s) received from one or more UWB antenna sets.

Figure 3:
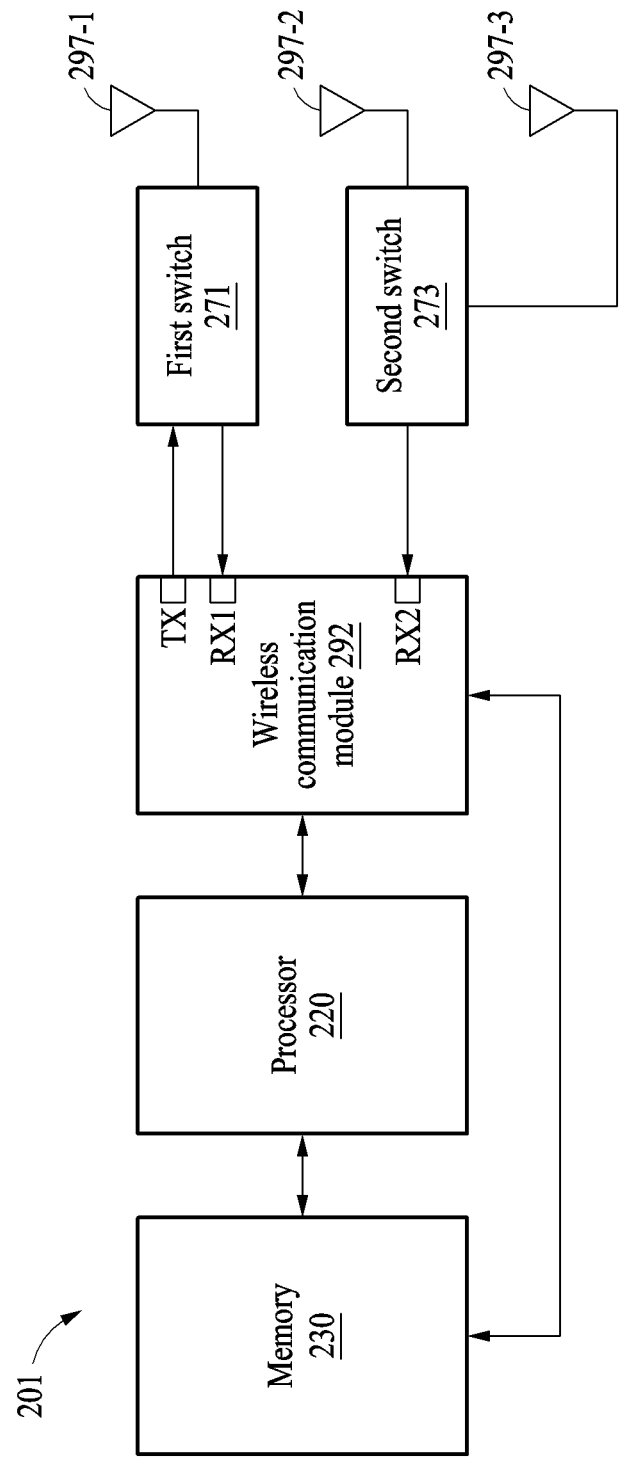
FIG. 3 is a block diagram illustrating an electronic device according to one embodiment.

FIG. 3 is a block diagram illustrating an electronic device according to one embodiment.

Referring to FIG. 3, the electronic device 201 may include a processor 220 (e.g., the processor 120 of FIG. 1), a memory 230 (e.g., the memory 130 of FIG. 1), a wireless communication module 292 (e.g., the wireless communication module 192 of FIG. 1), and the plurality of UWB antennas 297-1 to 297-3. The memory 230 may store one or more instructions to perform operations of the processor 220 and/or the wireless communication module 292. The processor 220 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

The wireless communication module 292 (e.g., UWB communication module) may perform UWB communication by using the plurality of UWB antennas 297-1 to 297-3 according to UWB communication protocol. The wireless communication module 292 may measure the position of a target device (e.g., the target device 302 of FIG. 3) with respect to the position of the electronic device 201 by using UWB signal(s) received from a first UWB antenna set (e.g., the first UWB antenna 297-1 and the second UWB antenna 297-2) and/or a second antenna set (e.g., the first UWB antenna 297-1 and the third UWB antenna 297-3). This may be done by controlling the first switch 271 and the second switch 273 in this embodiment.

The wireless communication module 292 may include a plurality of ports, such as a transmission port TX, a reception port RX1, and a reception port RX2. The transmission port TX and the reception port RX1 may be electrically connected to the first switch 271 (e.g., a double pole double throw (DPDT) switch) connected to the first UWB antenna 297-1. A transmission path may be between the transmission port TX and the first switch 271 and a reception path may be between the reception port RX1 and the first switch 271. The reception port RX2 may be electrically connected to the second switch 273 (e.g., a single pole double throw (SPDT) switch) connected to the second UWB antenna 297-2 and the third UWB antenna 297-3. A reception path may be between the reception port RX2 and the second switch 273. The paths between the wireless communication module 282 and the switches 271 and 273 and/or the paths between the switches 271 and 273 and the UWB antennas 297-1 to 297-3 may include various RF elements that are not shown (e.g., filter, amplifier, phase shifter, etc.).

The wireless communication module 292 may be electrically connected to the first UWB antenna 297-1 through the first switch 271. The first switch 271 may connect the first UWB antenna 297-1 to the transmission path or the reception path of the wireless communication module 292 based on control by the wireless communication module 292. The wireless communication module 292 may be electrically connected to the second UWB antenna 297-2 or the third UWB antenna 297-3 through the second switch 273. The second switch 273 may connect the second UWB antenna 297-2 or the third UWB antenna 297-3 to the reception path of the wireless communication module 292, based on control by the wireless communication module 292.

The wireless communication module 292 may determine the position of the target device 302 by receiving a UWB signal transmitted by the target device 302 by using a first UWB antenna set (e.g., the first UWB antenna 297-1 and the second UWB antenna 297-2) and/or a second UWB antenna set (e.g., the first UWB antenna 297-1 and the third UWB antenna 297-3) by controlling the switches 271 and 273. The electronic device 201 may determine the position of the target device 302 by using the UWB signal(s) received from one or more of the UWB antenna sets.

The wireless communication module 292 may perform a method of estimating a channel impulse response (CIR) for determining the confidence of the AoA of the UWB signal received from the target device 302. When estimating the CIR, the wireless communication module 292 may use pieces of phase information respectively corresponding to a plurality of CIR indices on the CIR and may determine information (e.g., the confidence level for the AoA of the UWB signal and/or a communication environment of the UWB signal) on the UWB signal, based on the pieces of phase information. For example, the wireless communication module 292 may determine whether the confidence level for the AoA of the UWB signal is high, intermediate, or low by performing the CIR estimation method. The wireless communication module 292 may determine whether the communication environment of the UWB signal is a line-of-sight (LoS) environment or a non-Los (NLoS) environment by performing the CIR estimation method.

The wireless communication module 292 may output, to the processor 220, at least one of distance information between the electronic device 201 and the target device 302 and direction information (e.g., the AoA information of the UWB signal) of the target device 302, based on above-mentioned analyses of the UWB signal. For example, when the confidence level for the AoA of the UWB signal is high, the wireless communication module 292 may output, to the processor 220, accurate direction information of the target device 302 with the distance information between the electronic device 201 and the target device 302. When the confidence level for the AoA of the UWB signal is intermediate, the wireless communication module 292 may output, to the processor 220, rough direction information (e.g., right direction, left direction, or the like) of the target device 302 with the distance information between the electronic device 201 and the target device 302. When the confidence level for the AoA of the UWB signal is low, the wireless communication module 292 may output, to the processor 220, only the distance information between the electronic device 201 and the target device 302. For a service executed by the processor 220 (e.g., service utilizing UWB communication, such as the finding service to find the target device, the service employing tags, or the service employing trackers), the processor 220 may provide, to the user, at least one of the distance information between the electronic device 201 and the target device 302 and the direction information (e.g., the AoA information of the UWB signal) of the target device 302 as a voice signal (e.g., voice notification) and/or a visual signal (e.g., user interface (UI)). Outputting the direction information of the target device 302 for the service executed by the processor 220 may be determined based on the information (e.g., the confidence level for the AoA of the UWB signal and/or the communication environment of the UWB signal) regarding the UWB signal.

Figure 4:
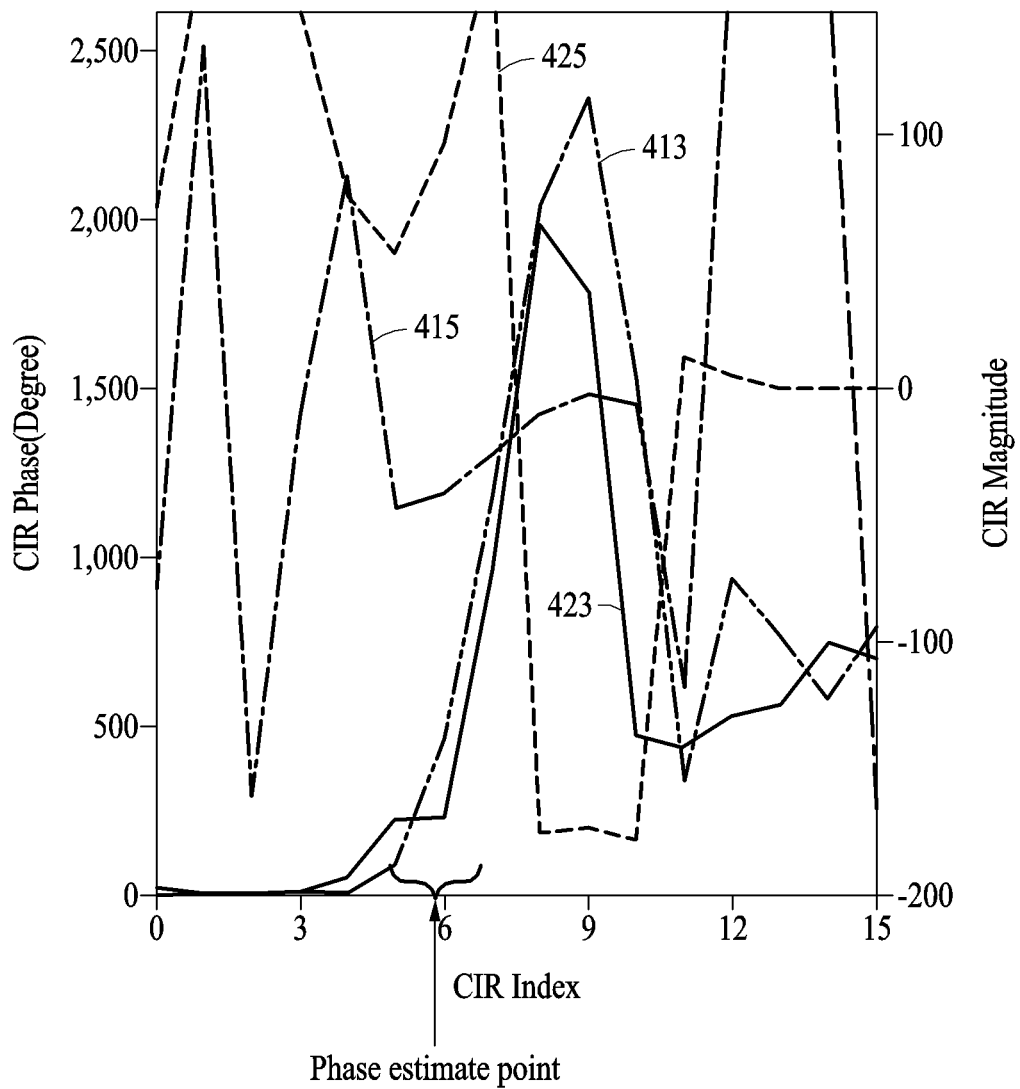
FIG. 4 is a diagram illustrating a method of estimating a channel impulse response (CIR) according to one embodiment.

FIG. 4 is a diagram illustrating a method of estimating a CIR according to one embodiment.

Referring to FIG. 4, the wireless communication module 292 may perform the CIR estimation method using pieces of phase information corresponding to a plurality of CIR indices, respectively, on a CIR. In FIG. 4, the x-axis may represent a CIR index, the right y-axis may represent magnitude, and the left y-axis may represent phase information (e.g., phase value). Lines 413 and 415 may represent the CIR magnitude and the CIR phase of UWB signals received through one of the plurality of UWB antennas 297-1 to 297-3. Lines 423 and 425 may represent the CIR magnitude and the CIR phase of UWB signals received through another one of the plurality of UWB antennas 297-1 to 297-3.

The wireless communication module 292 may obtain first pieces of phase information corresponding to first CIR indices, respectively, and second pieces of phase information corresponding to second CIR indices, respectively, based on the UWB signals received from the target device 302. For example, the first pieces of phase information may be phase information corresponding to the first CIR indices on the first CIR (e.g., the line 413 and/or the line 415) of the UWB signals received through one of the plurality of UWB antennas 297-1 to 297-3. The second pieces of phase information may be phase information corresponding to the second plurality of CIR indices on the second CIR (e.g., the line 423 and/or the line 425) of the UWB signals received from another one of the plurality of UWB antennas 297-1 to 297-3. Alternatively, the first pieces of phase information and the second pieces of phase information may be phase information corresponding to the first CIR indices and the second plurality of CIR indices on the CIR of the UWB signals received from the same one of the plurality of UWB antennas 297-1 to 297-3. The first pieces of CIR indices may be the same as or different from the second pieces of CIR indices.

The wireless communication module 292 may determine the confidence level for the AoA of the UWB signal by using the first pieces of phase information corresponding to the first CIR indices and the second pieces of phase information corresponding to the second CIR indices. These pieces of phase information may be used to determine additional information on the UWB signal, as described below. The wireless communication module 292 may identify and remove inaccurate AoA based on the information on the UWB signal. When only the phase information (e.g., phase value) corresponding to one CIR index of a point corresponding to a first path in the CIR is used to measure (e.g., calculate) the AoA of the UWB signal received from the target device 302, the AoA of the UWB signal may be inaccurately calculated as the probability of using wrong phase information increases when the UWB signal received by the electronic device 201 is unstable (e.g., unstable magnitude information or unstable phase information). The wireless communication module 292 may determine the confidence level for the AoA of the UWB signal received from the target device 302 by performing the CIR estimation method by using the pieces of phase information corresponding to the plurality of CIR indices on the CIR. The plurality of CIR indices may include consecutive CIR indices based on the CIR index of the first path on the CIR. The wireless communication module 292 may obtain accurate AoA of the UWB signal received from the target device 302 and may use the obtained AoA to detect the direction with respect to the target device 302. The user may be provided with accurate direction information for a service using UWB communication by the electronic device 201 (e.g., service utilizing UWB communication, such as the finding service to find the target device, the service employing tags, or the service employing trackers) and may improve user experience.

Figure 5:
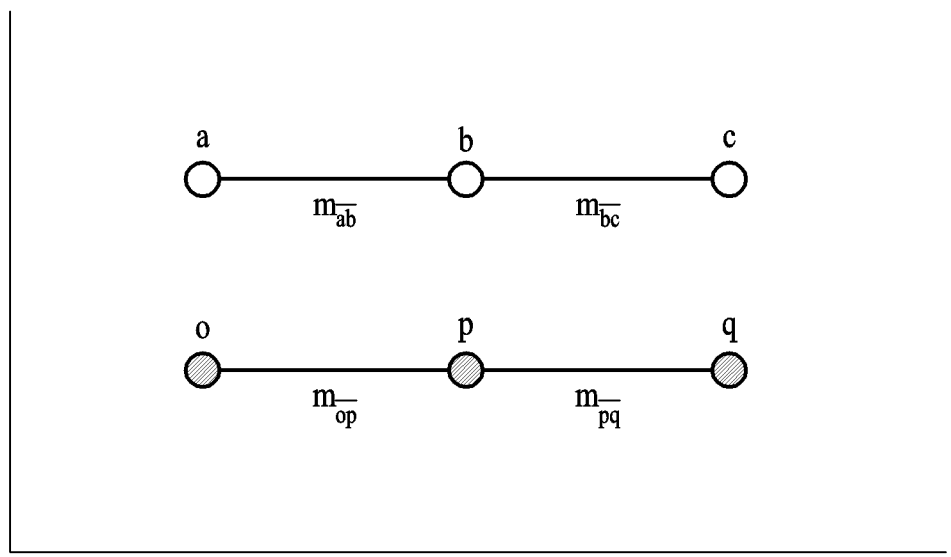
FIG. 5 is a diagram illustrating a method of determining information on an ultra-wideband (UWB) signal, according to one embodiment.

FIG. 5 is a diagram illustrating a method of determining information on an ultra-wideband (UWB) signal, according to one embodiment.

FIG. 5 may illustrate the method where the wireless communication module 292 determines information on a UWB signal by using the pattern of a slope between first pieces of phase information and the pattern of a slope between second pieces of phase information. In FIG. 5, the x-axis may represent CIR index and the y-axis may represent phase information (e.g., phase value).

Referring to FIG. 5, the wireless communication module 292 may extract points a, b, and c on the first CIR (e.g., the line 413 and/or the line 415 of FIG. 4) of a UWB signal. The point b may be a point corresponding to a first path on the first CIR and the point a and the point c may be points located before and after the point b. The wireless communication module 292 may obtain phase information corresponding to the first CIR indices on the first CIR. The first CIR indices may include a first CIR index (e.g., the x-axis value of the point b) on the first CIR, a previous CIR index (e.g., the x-axis value of the point a) of the first CIR index, and a subsequent CIR index after the first CIR index (e.g., the x-axis value of the point c). For example, the first CIR index may be a CIR index corresponding to the first path on the first CIR. The phase information corresponding to the first CIR index on the first CIR (e.g., the y-axis value of the point b), the phase information corresponding to the previous CIR index of the first CIR index (e.g., the y-axis value of the point a), and the phase information corresponding to the subsequent CIR index after the first CIR index (e.g., the y-axis value of the point c) may then be determined after points a, b, and c are determined.

The wireless communication module 292 may extract points o, p, and q on the second CIR (e.g., the solid line 423 and/or the line 425 of FIG. 4) of the UWB signal. The point p may be a point corresponding to the first path of the second CIR, the point o and the point q may be points located before and after the point p. The wireless communication module 292 may obtain phase information corresponding to the second CIR indices on the second CIR. The second CIR indices may include a second CIR index (e.g., the x-axis value of the point p) on the second CIR, a previous CIR index (e.g., the x-axis value of the point o) of the second CIR index, and a subsequent CIR index after the second CIR index (e.g., the x-axis value of the point q). For example, the second CIR index may be a CIR index corresponding to the first path on the second CIR. The phase information corresponding to the second CIR index on the second CIR (e.g., the y-axis value of the point p), the phase information corresponding to the previous CIR index of the second CIR index (e.g., the y-axis value of the point o), and the phase information corresponding to the subsequent CIR index after the second CIR index (e.g., the y-axis value of the point q) may then be determined after points o, p, and q are determined.

The wireless communication module 292 may obtain first slope values by using the first pieces of phase information and may obtain second slope values by using the second pieces of phase information. The wireless communication module 292 may calculate (e.g., $m_{\overline{ab}}$) represented by a line segment connecting the phase information of point a to the phase information of point b and may calculate a slope value (e.g., $m_{\overline{bc}}$) represented by a line segment connecting the phase information of point b to the phase information of point c. In addition, the wireless communication module 292 may calculate a slope value (e.g., $m_{\overline{op}}$) represented by a line segment connecting the phase information of point o to the phase information of point p and may calculate a slope value (e.g., $m_{\overline{pq}}$) represented by a line segment connecting the phase information of point p to the phase information of point q.

The wireless communication module 292 may determine whether the slope value falls within a range corresponding to a condition (e.g., shift condition) by using the slope values (e.g., the calculated four slope values) and accordingly, may determine information on the UWB signal. For example, the wireless communication module 292 may determine whether a first difference between first slope values (e.g., $m_{\overline{ab}}$ and $m_{\overline{bc}}$) satisfies a first condition, may determine whether a second difference between second slope values (e.g., $m_{\overline{op}}$ and $m_{\overline{pq}}$) satisfies a second condition, and may determine the information on the UWB signal based on the result of such determinations. These determinations may indicate that the phase information may not significantly change during a short period (e.g., several ns) when the electronic device 201 receives a signal (e.g., the UWB signal).

The wireless communication module 292 may determine whether the first condition is satisfied by using Equation 1 and may determine whether the second condition is satisfied by using Equation 2.

$$|m_{\overline{ab}} - m_{\overline{bc}}| \leq \varepsilon_0, \quad \text{[Equation 1]}$$
$$m_{\overline{ab}} = \frac{b_y - a_y}{b_x - a_x},$$
$$m_{\overline{bc}} = \frac{c_y - b_y}{c_x - b_x}$$
$$|m_{\overline{op}} - m_{\overline{pq}}| \leq \varepsilon_0, \quad \text{[Equation 2]}$$
$$m_{\overline{op}} = \frac{p_y - o_y}{p_x - o_x},$$
$$m_{\overline{pq}} = \frac{q_y - p_y}{q_x - p_x}$$

Here, $a_x$ and $a_y$ may respectively represent the CIR index and phase information (e.g., phase value) of the point a, $b_x$ and $b_y$ respectively may represent the CIR index and phase information (e.g., phase value) of the point b, and $c_x$ and $c_y$ may respectively represent the CIR index and phase information (e.g., phase value) of the point c. $o_x$ and $o_y$ may respectively represent the CIR index and phase information (e.g., phase value) of the point o, $p_x$ and $p_y$ may respectively represent the CIR index and phase information (e.g., phase value) of the point p, and $q_x$ and $q_y$ may respectively represent the CIR index and phase information (e.g., phase value) of the point q. The threshold may be set to be a predetermined value.

The information on the UWB signal may be determined by wireless communication module 292 based on various results of the equations above. For example, the results may be categorized into various cases, where a first case satisfies both the first condition and the second condition, a second case satisfies the first condition but not the second condition, a third case satisfies the second condition but not the first condition, and a fourth case satisfies neither the first condition nor the second condition. For determining the confidence level for the AoA of the UWB signal, the wireless communication module 292 may determine that the confidence level is high in the first case, the confidence level is intermediate in the second and third cases, and the confidence level is low in the fourth case. In addition, the wireless communication module 292 may determine (e.g., estimate) the communication environment (e.g., LoS and NLoS) of the UWB signal. For example, the wireless communication module 292 may determine that in the first case, the communication environment of the UWB signal is an LoS environment and in the fourth case, the communication environment of the UWB signal is an NLoS environment. In the second and third cases, the wireless communication module 292 may determine that the communication environment of the UWB signal is either an LoS environment or an NLoS environment, or may fail to determine the precise environment.

Figure 6:
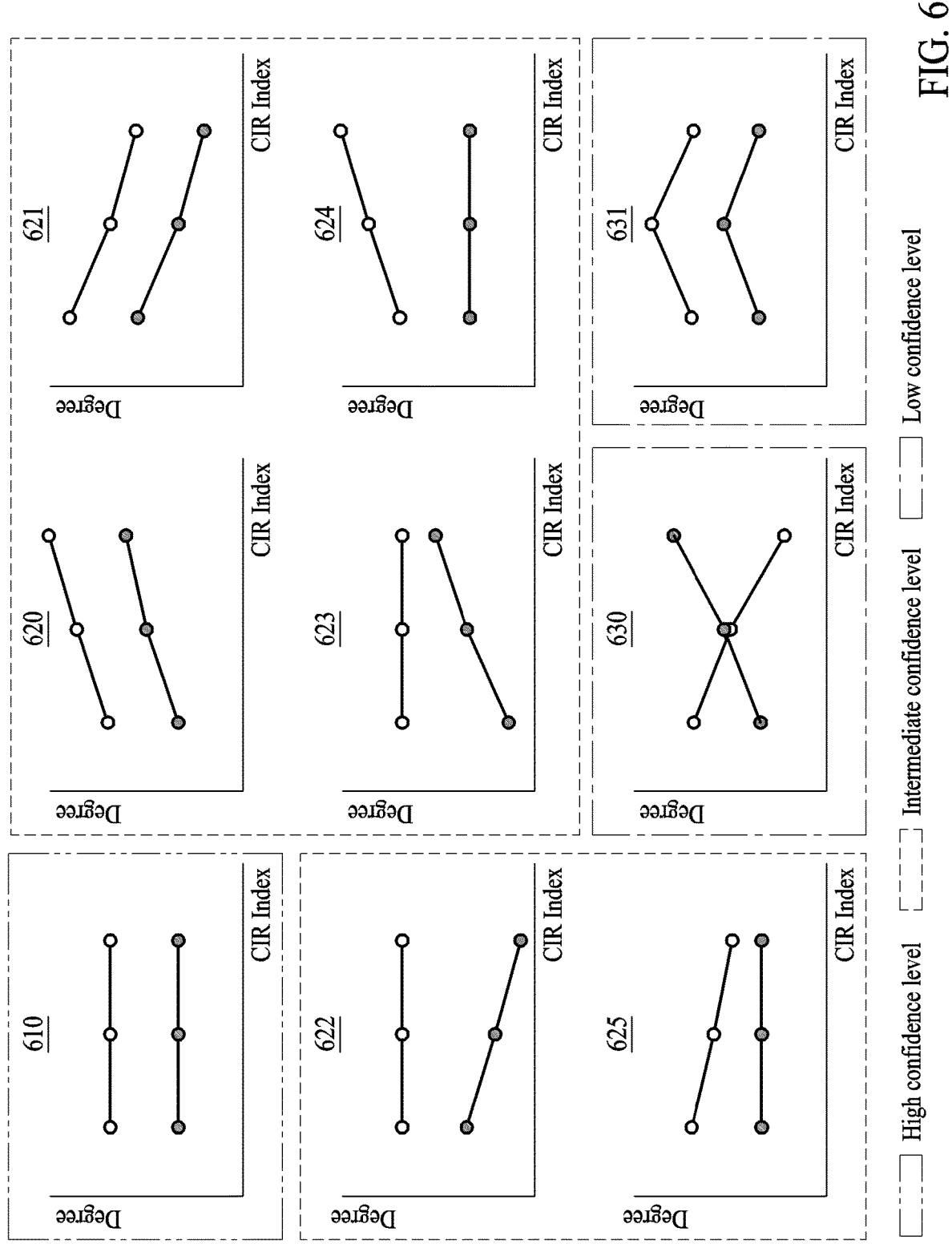
FIG. 6 is a diagram illustrating an example of a method of determining information on a UWB signal, according to one embodiment.

FIG. 6 is a diagram illustrating an example of a method of determining information on a UWB signal, according to one embodiment.

Referring to FIG. 6, examples of patterns of slopes between the first pieces of phase information and the pattern of slopes between the second pieces of phase information embodying all four cases mentioned above are shown in FIG. 6. In FIG. 6, a slope pattern 610 may represent that the confidence level for AoA is high, slope patterns 620 to 625 may represent that the confidence level for the AoA is intermediate, and slope patterns 630 and 631 may represent that the confidence level for the AoA is low. The wireless communication module 292 may determine the confidence level for the AoA of the UWB signal by using the pattern of a slope between the first pieces of phase information and the pattern of a slope between the second pieces of phase information. Similarly, the wireless communication module 292 may determine (e.g., estimate) the communication environment (e.g., LoS and NLoS) of the UWB signal.

Figure 7:
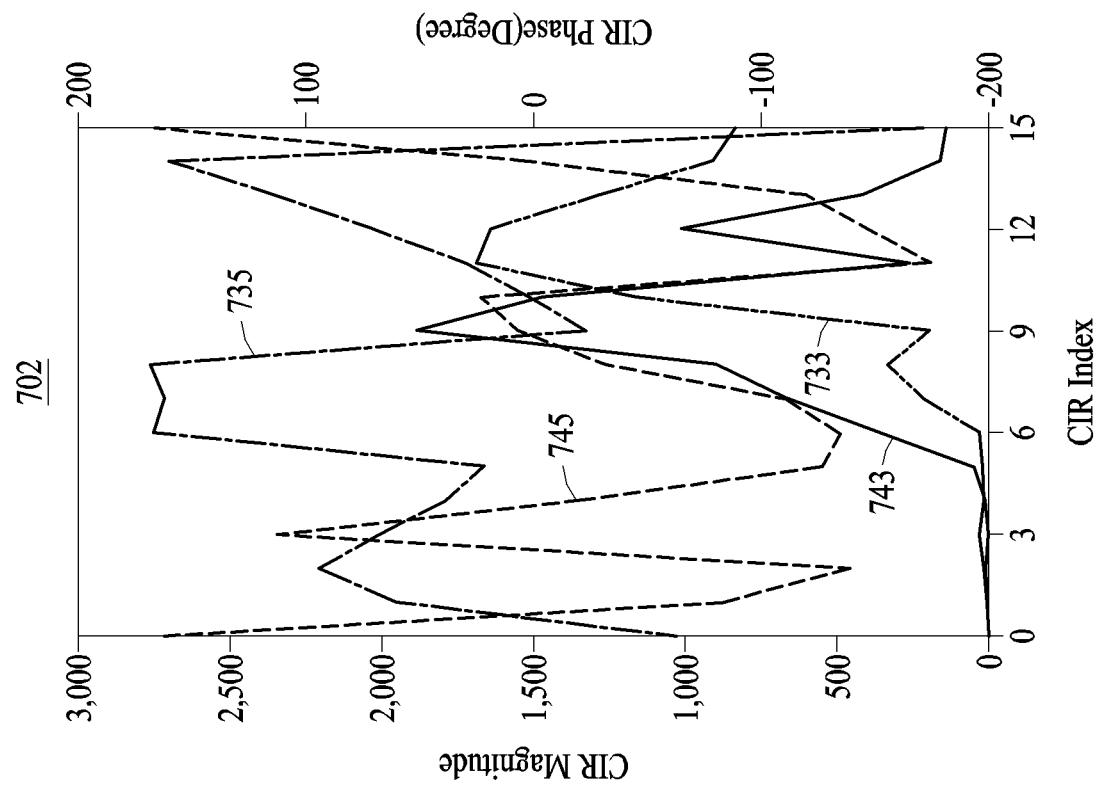
FIG. 7 is a diagram illustrating an example of the method of determining information on a UWB signal, according to one embodiment.
Figure 7:
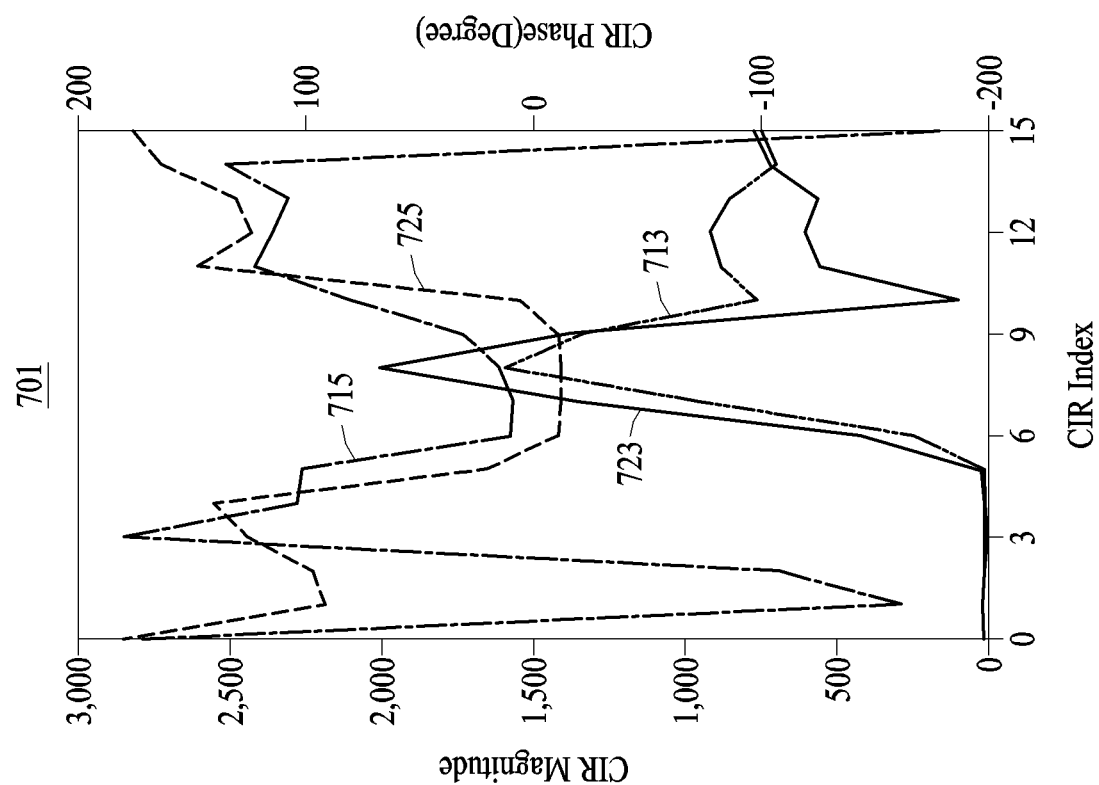

FIG. 7 is a diagram illustrating an example of the method of determining information on a UWB signal, according to one embodiment.

In FIG. 7, the x-axis may represent the CIR index, the right y-axis may represent magnitude, and the left y-axis may represent phase information (e.g., phase value). A graph 701 may represent the CIR magnitude and the CIR phase of UWB signals received in a first environment. In the graph 701, lines 713 and 715 may represent the CIR magnitude and the CIR phase of UWB signals received through one of the plurality of UWB antennas 297-1 to 297-3 and lines 723 and 725 may represent the CIR magnitude and the CIR phase of UWB signals received through another one of the plurality of UWB antennas 297-1 to 297-3. A graph 702 may represent the CIR magnitude and the CIR phase of UWB signals received in a second environment. In the graph 702, lines 733 and 735 may represent the CIR magnitude and the CIR phase of UWB signals received through one of the plurality of UWB antennas 297-1 to 297-3 and lines 743 and 745 may represent the CIR magnitude and the CIR phase of UWB signals received through another one of the plurality of UWB antennas 297-1 to 297-3.

In the graph 701, the wireless communication module 292 may extract the first pieces of phase information corresponding to the first CIR indices and the second pieces of phase information corresponding to the second CIR indices from the graph 701 and may determine the information on the UWB signal by using a slope pattern between the first pieces of phase information and a slope pattern between the second pieces of phase information. In this case, the wireless communication module 292 may determine that the confidence level for the AoA of the UWB signal is high and the communication environment of the UWB signal is the LoS environment.

In the graph 702, the wireless communication module 292 may extract the first pieces of phase information corresponding to the first CIR indices and the second pieces of phase information corresponding to the second CIR indices from the graph 702 and may determine the information on the UWB signal by using a pattern of a slope between the first pieces of phase information and a pattern of a slope between the second pieces of phase information. In this case, the wireless communication module 292 may determine that the confidence level for the AoA of the UWB signal is low and the communication environment of the UWB signal is the NLoS environment.

Figure 8:
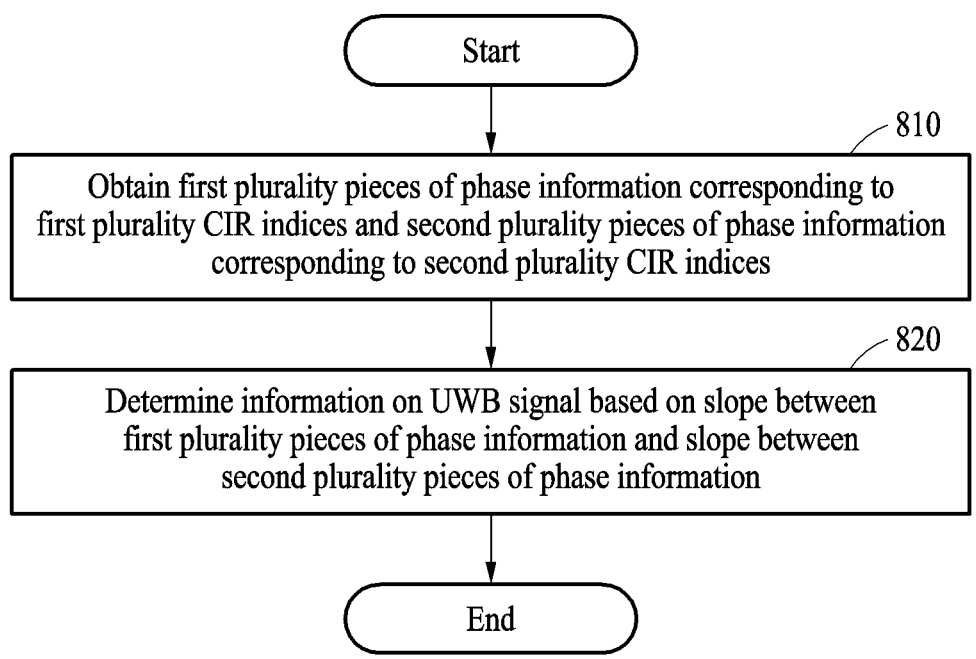
FIG. 8 is a flowchart illustrating an example of an operating method of an electronic device, according to one embodiment.

FIG. 8 is a flowchart illustrating an example of an operating method of an electronic device according to one embodiment.

Operations 810 and 820 may be sequentially performed, but the instant disclosure is not limited thereto. For example, operations 810 and 820 may be performed in parallel.

In operation 810, the wireless communication module 292 may obtain first pieces of phase information corresponding to first CIR indices and second pieces of phase information corresponding to second CIR indices, based on UWB signal (s) received from the target device 302.

In operation 820, the wireless communication module 292 may determine information on the UWB signal based on the slope between the first pieces of phase information and the slope between the second pieces of phase information.

Figure 9:
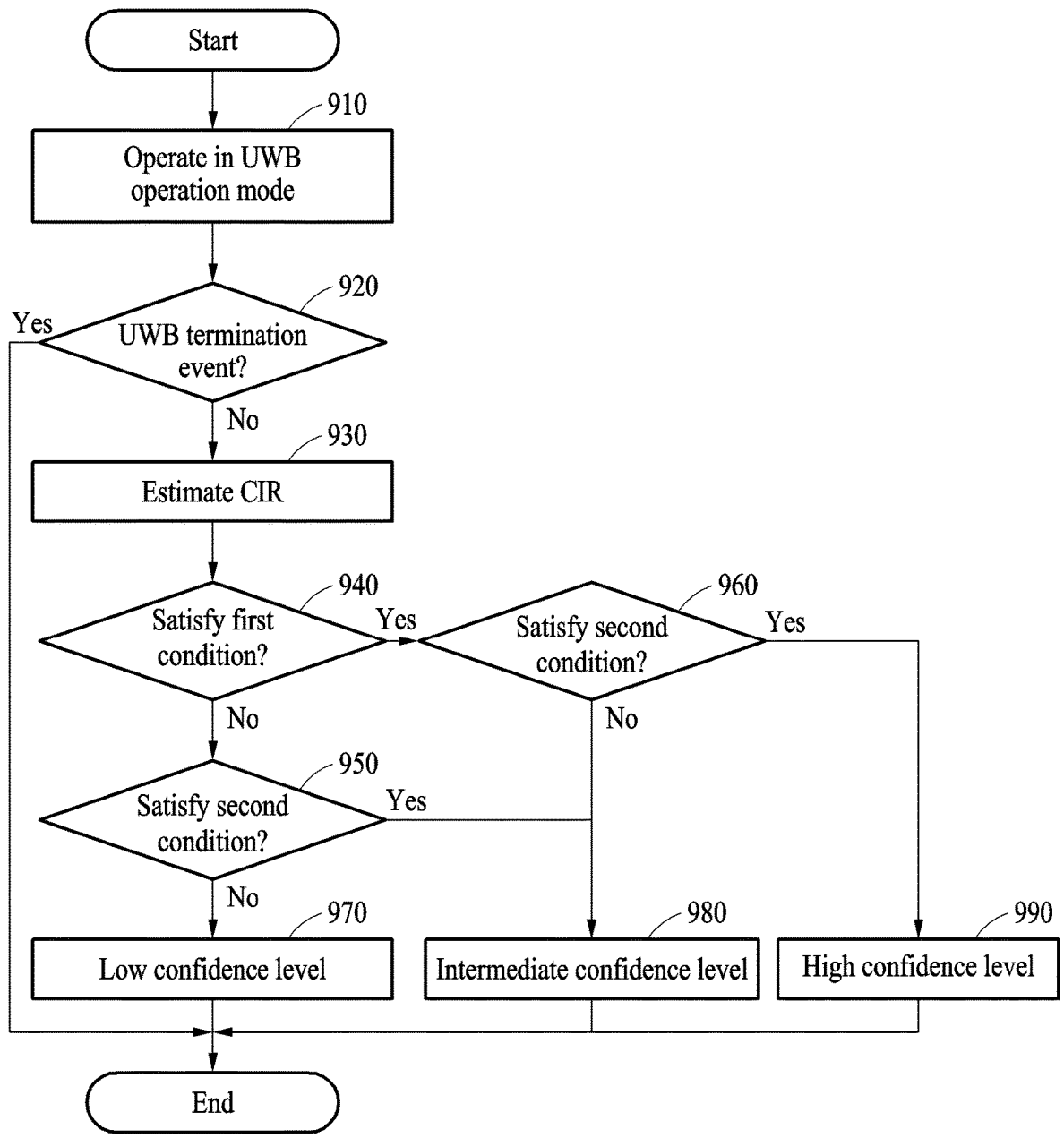
FIG. 9 is a flowchart illustrating an example of an operating method of an electronic device according to one embodiment.

FIG. 9 is a flowchart illustrating an example of an operating method of an electronic device according to one embodiment.

In FIG. 9, operations 910 to 990 may be an example illustrating a method, performed by the electronic device 201, of determining the confidence level for an AoA of a UWB signal. Operations 910 to 990 may be sequentially performed, but the instant disclosure is not limited thereto. For example, the operations 910 and 990 may be performed in different orders, and at least two operations may be performed in parallel.

In operation 910, the wireless communication module 292 may operate in a UWB operation mode. For example, the wireless communication module 292 may operate in the UWB operation mode when a service executed by the processor 220 is a UWB communication service (e.g., service utilizing UWB communication, such as the finding service to find the target device, the service employing tags, or the service employing trackers).

In operation 920, the wireless communication module 292 may identify whether an UWB termination event is present. The wireless communication module 292 may identify whether the service executed by the processor and using UWB communication is terminated. When the wireless communication module 292 identifies the UWB termination event, the wireless communication module 292 may terminate the UWB operation mode. When the UWB termination event is not identified, the wireless communication module 292 may perform operations 930 to 990.

In operation 930, the wireless communication module 292 may perform a CIR estimation method by using pieces of phase information corresponding to a plurality of CIR indices, embodiments of which are described above. For example, the wireless communication module 292 may obtain first pieces of phase information corresponding to first CIR indices and second pieces of phase information corresponding to second CIR indices based on UWB signals received from a target device. The wireless communication module 292 may obtain first slope values by using the first pieces of phase information and may obtain second slope values by using the second pieces of phase information.

In operation 940, the wireless communication module 292 may determine whether a first difference between first slope values satisfies a first condition. For example, the wireless communication module 292 may determine whether the first condition is satisfied by using Equation 1.

In operations 950 and 960, the wireless communication module 292 may determine whether a second difference between second slope values satisfies a second condition. For example, the wireless communication module 292 may determine whether the second condition is satisfied by using Equation 2. The wireless communication module 292 may determine whether the second condition is satisfied regardless of whether the first condition is satisfied.

In operation 970, in the fourth case where both the first condition and the second condition are not satisfied, the wireless communication module 292 may determine that the confidence level for the AoA of the UWB signal is low.

In operation 980, in the second case satisfying the first condition but not satisfying the second condition and in the third case not satisfying the first condition but satisfying the second condition, the wireless communication module 292 may determine that the confidence level for the AoA of the UWB signal is intermediate.

In operation 990, in the first case satisfying both the first condition and the second condition, the wireless communication module 292 may determine that the confidence level for the AoA of the UWB signal is high.

According to an embodiment, an electronic device (e.g., the electronic device 201 of FIG. 2) may include a plurality of antennas (e.g., the plurality of antennas 297-1 to 297-3 of FIG. 2), at least one wireless communication module (e.g., the wireless communication module 292 of FIG. 3) configured to transmit and receive wireless signals through the plurality of antennas, and at least one processor (e.g., the processor 220 of FIG. 3) operatively connected to the wireless communication module, wherein the at least one wireless communication module or the at least one processor may be configured to, based on one or more UWB signals received from a target device (e.g., the target device 302 of FIG. 2), obtain (e.g., operation 810 of FIG. 8) first pieces of phase information corresponding to first CIR indices and second pieces of phase information corresponding to second CIR indices, and determine (e.g., operation 820 of FIG. 8) information on the one or more UWB signals based on a slope between the first pieces of phase information and a slope between the second pieces of phase information.

The information on the one or more UWB signals may include at least one of a confidence level for an angle of arrival of the one or more UWB signals and a communication environment of the one or more UWB signals.

The wireless communication module or the at least one processor may be further configured to determine the information on the one or more UWB signals based on a pattern of the slope between the first pieces of phase information and a pattern of the slope between the second pieces of phase information.

The first pieces of phase information may be obtained on a first CIR of a first UWB signal received through one of the plurality of antennas, and the second pieces of phase information may be obtained on a second CIR of a first UWB signal received through another one of the plurality of antennas.

The first CIR indices may include a first CIR index on the first CIR, a previous CIR index of the first CIR index, and a subsequent CIR index after the first CIR index, and the second CIR indices may include a second CIR index on the second CIR, a previous CIR index of the second CIR index, and a subsequent CIR index after the second CIR index.

The first CIR index may correspond to a first path in the first CIR, and the second CIR index may correspond to a first path in the second CIR.

The wireless communication module or the at least one processor may be further configured to obtain first slope values of the first pieces of phase information, and obtain second slope values of the second pieces of phase information.

The wireless communication module or the at least one processor may be further configured to determine whether a first difference between the first slope values satisfies a first condition, determine whether a second difference between the second slope values satisfies a second condition, and determine the information on the one or more UWB signals based on whether the first difference between the first slope values satisfies the first condition and whether the second difference between the second slope values satisfies the second condition.

The wireless communication module or the at least one processor may be further configured to determine whether a communication environment of the one or more UWB signals is a line-of-sight (LoS) environment or a non-LoS (NLoS) environment based on whether the first difference between the first slope values satisfies the first condition and whether the second difference between the second slope values satisfies the second condition.

An output of direction information of the target device for a service executed by the at least one processor may be determined based on the information on the one or more UWB signals.

According to an embodiment, an operating method of an electronic device (e.g., the electronic device 201 of FIG. 2) may include, based on one or more UWB signals received from a target device (e.g., the target device 302 of FIG. 2), obtaining (e.g., operation 810 of FIG. 8) first pieces of phase information corresponding to first CIR indices and second pieces of phase information corresponding to second CIR indices, and determining (e.g., operation 820 of FIG. 8) information on the one or more UWB signals based on a slope between the first pieces of phase information and a slope between the second pieces of phase information.

The information on the one or more UWB signals may include at least one of a confidence level for an AoA of the one or more UWB signals and a communication environment of the one or more UWB signals.

The determining may include determining the information on the one or more UWB signals based on a pattern of the slope between the first pieces of phase information and a pattern of the slope between the second pieces of phase information.

The first pieces of phase information may be obtained on a first CIR of a first UWB signal received through one of a plurality of antennas (e.g., the plurality of antennas 297-1 to 297-3 of FIG. 2) included in the electronic device, and the second pieces of phase information may be obtained on a second CIR of a second UWB signal received through another one of the plurality of antennas.

The first CIR indices may include a first CIR index on the first CIR, a previous CIR index of the first CIR index, and a subsequent CIR index after the first CIR index, and the second CIR indices may include a second CIR index on the second CIR, a previous CIR index of the second CIR index, and a subsequent CIR index after the second CIR index.

The first CIR index may correspond to a first path in the first CIR, and the second CIR index may correspond to a first path in the second CIR.

The determining may include obtaining first slope values of the first pieces of phase information, and obtaining second slope values of the second pieces of phase information.

The determining may further include determining whether a first difference between the first slope values satisfies a first condition, determining whether a second difference between the second slope values satisfies a second condition, and determining the information on the one or more UWB signals based on whether the first difference between the first slope values satisfies the first condition and whether the second difference between the second slope values satisfies the second condition.

The determining may further include determining whether a communication environment of the one or more UWB signals is a line-of-sight (LoS) environment or a non-LoS (NLoS) environment based on whether the first difference between the first slope values satisfies the first condition and whether the second difference between the second slope values satisfies the second condition.

An output of direction information of the target device for a service executed by the electronic device may be determined based on the information on the one or more UWB signals.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a plurality of antennas;
at least one wireless communication module configured to transmit and receive wireless signals through the plurality of antennas; and
at least one processor operatively connected to the wireless communication module,
wherein the at least one wireless communication module or the at least one processor is configured to:
based on one or more ultra-wide band (UWB) signals received from a target device, obtain first pieces of phase information corresponding to first channel impulse response (CIR) indices and second pieces of phase information corresponding to second CIR indices, and
determine information on the one or more UWB signals based on a slope between the first pieces of phase information and a slope between the second pieces of phase information, and
wherein the wireless communication module or the at least one processor is further configured to:
obtain first slope values of the first pieces of phase information,
obtain second slope values of the second pieces of phase information,
determine whether a first difference between the first slope values satisfies a first condition,
determine whether a second difference between the second slope values satisfies a second condition, and
determine the information on the one or more UWB signals based on whether the first difference between the first slope values satisfies the first condition and whether the second difference between the second slope values satisfies the second condition.

2. The electronic device of claim 1, wherein the information on the one or more UWB signals comprises a confidence level for an angle of arrival of the one or more UWB signals and/or a communication environment of the one or more UWB signals.

3. The electronic device of claim 1, wherein the wireless communication module or the at least one processor is further configured to determine the information on the one or more UWB signals based on a pattern of the slope between the first pieces of phase information and a pattern of the slope between the second pieces of phase information.

4. The electronic device of claim 1, wherein the first pieces of phase information are obtained on a first CIR of a first UWB signal received through one of the plurality of antennas, and
the second pieces of phase information are obtained on a second CIR of a second UWB signal received through another one of the plurality of antennas.

5. The electronic device of claim 4, wherein the first CIR indices comprise a first CIR index on the first CIR, a previous CIR index of the first CIR index, and a subsequent CIR index after the first CIR index, and
the second CIR indices comprise a second CIR index on the second CIR, a previous CIR index of the second CIR index, and a subsequent CIR index after the second CIR index.

6. The electronic device of claim 5, wherein the first CIR index corresponds to a first path in the first CIR, and
the second CIR index corresponds to a first path in the second CIR.

7. The electronic device of claim 1, wherein the wireless communication module or the at least one processor is further configured to:
determine whether a communication environment of the one or more UWB signals is a line-of-sight (LoS) environment or a non-LoS (NLoS) environment based on whether the first difference between the first slope values satisfies the first condition and whether the second difference between the second slope values satisfies the second condition.

8. The electronic device of claim 1, wherein an output of direction information of the target device for a service executed by the at least one processor is determined based on the information on the one or more UWB signals.

9. An operating method of an electronic device, the operating method comprising:
based on one or more ultra-wide band (UWB) signals received from a target device, obtaining first pieces of phase information corresponding to first channel impulse response (CIR) indices and second pieces of phase information corresponding to second CIR indices; and
determining information on the one or more UWB signals based on a slope between the first pieces of phase information and a slope between the second pieces of phase information, and
wherein the determining further comprises:
obtaining first slope values of the first pieces of phase information;
obtaining second slope values of the second pieces of phase information,
determining whether a first difference between the first slope values satisfies a first condition;
determining whether a second difference between the second slope values satisfies a second condition; and
determining the information on the one or more UWB signals based on whether the first difference between the first slope values satisfies the first condition and whether the second difference between the second slope values satisfies the second condition.

10. The method of claim 9, wherein the information on the one or more UWB signals comprises a confidence level for an angle of arrival of the one or more UWB signals and/or a communication environment of the one or more UWB signals.

11. The method of claim 9, wherein the determining further comprises determining the information on the one or more UWB signals based on a pattern of the slope between the first pieces of phase information and a pattern of the slope between the second pieces of phase information.

12. The method of claim 9, wherein the first pieces of phase information are obtained on a first CIR of a first UWB signal received through one of a plurality of antennas comprised in the electronic device, and
the second pieces of phase information are obtained on a second CIR of a second UWB signal received through another one of the plurality of antennas.

13. The method of claim 12, wherein the first CIR indices comprise a first CIR index on the first CIR, a previous CIR index of the first CIR index, and a subsequent CIR index after the first CIR index, and
the second CIR indices comprise a second CIR index on the second CIR, a previous CIR index of the second CIR index, and a subsequent CIR index after the second CIR index.

14. The method of claim 13, wherein the first CIR index corresponds to a first path in the first CIR, and
the second CIR index corresponds to a first path in the second CIR.

15. The method of claim 9, wherein the determining further comprises:
determining whether a communication environment of the one or more UWB signals is a line-of-sight (LoS) environment or a non-LoS (NLoS) environment based on whether the first difference between the first slope values satisfies the first condition and whether the second difference between the second slope values satisfies the second condition.

16. The method of claim 9, wherein an output of direction information of the target device for a service executed by the electronic device is determined based on the information on the one or more UWB signals.

* * * * *